Sept. 24, 1929.  B. E. ROSE  1,729,229
REVOLVING SCRAPER
Filed Oct. 19, 1927   2 Sheets-Sheet 1
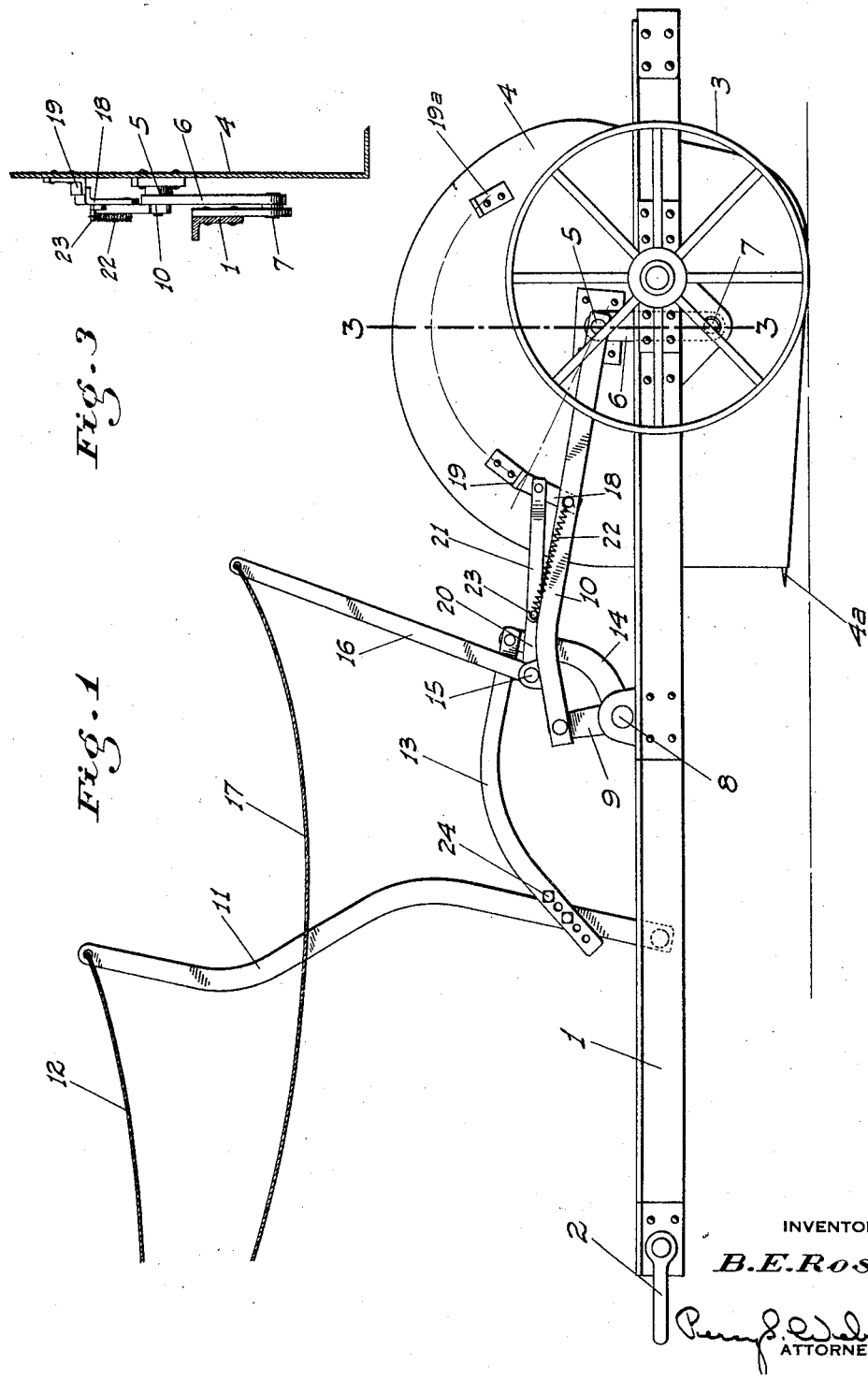

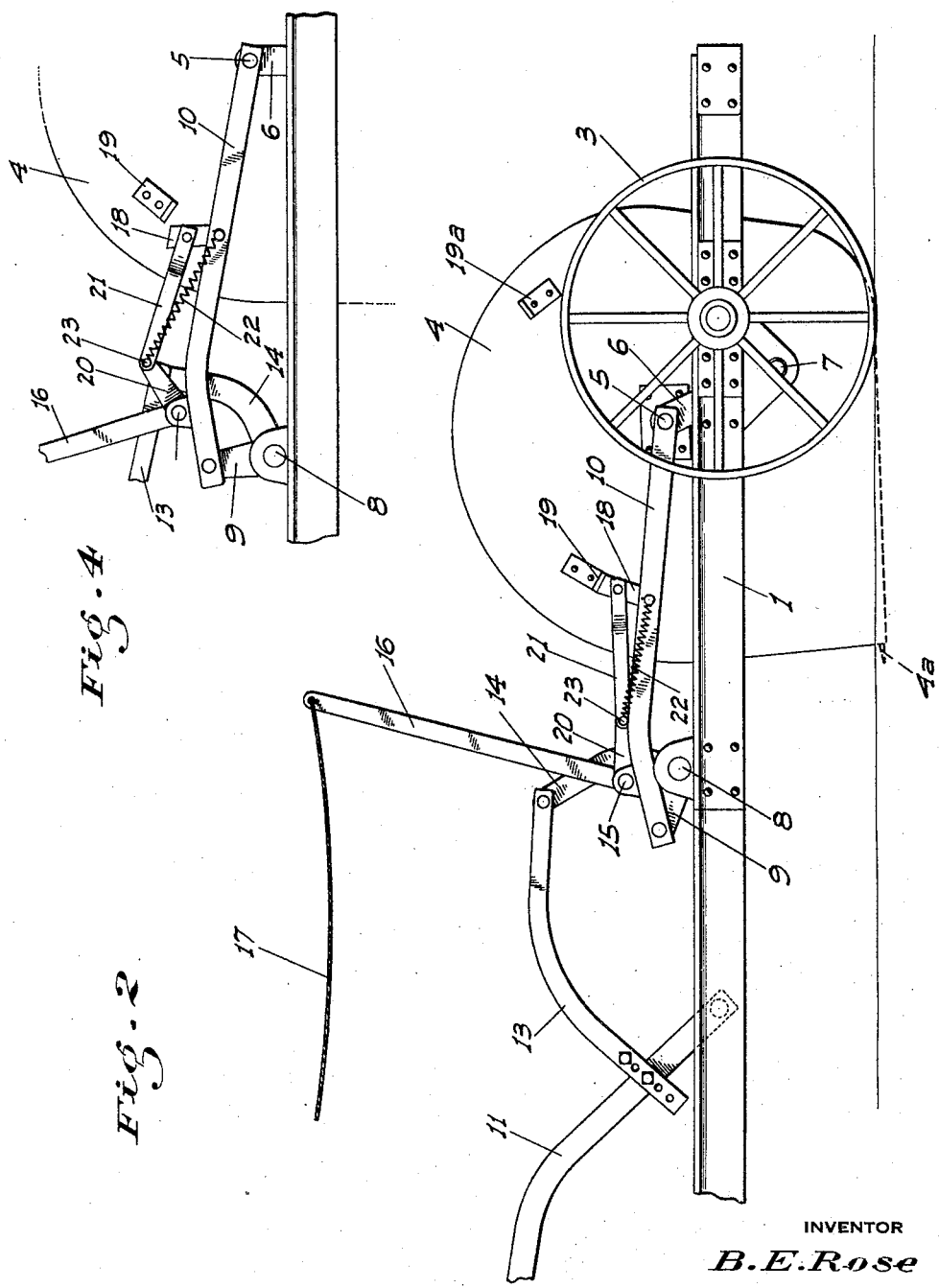

Patented Sept. 24, 1929

1,729,229

UNITED STATES PATENT OFFICE

BRUCE E. ROSE, OF EXETER, CALIFORNIA

REVOLVING SCRAPER

Application filed October 19, 1927. Serial No. 227,157.

This invention relates to improvements in scrapers of that type having a bowl mounted on trunnions and tending to rotate and upset with the forward movement of the scraper.

The principal object of my invention is to provide in a scraper of this character a control mechanism for the bowl, and a particular manner of mounting the bowl itself, so that as the scraper moves forwardly the bowl tends to automatically turn just a sufficient distance to shift the blade of the bowl from a ground engaging or scraping position to a transporting position, or in other words to rock forwardly and upwardly about the trunnions to a limited extent.

At the same time when it is desired to have the bowl turn and upset forwardly to a spreading or dumping position, it is only necessary to release a simple catch mechanism in order to cause the bowl to thus turn. With my improved bowl mounting and control mechanism arrangement the main control lever is held in a certain position during loading operations and the release of this lever instantly causes the bowl to turn with its load to a transporting position without any lifting of the bowl and load on the part of the operator being necessary.

Since the physical effort or pressure necessary to maintain the bowl in a scraping position is much less than that necessary to lift the loaded bowl as must usually be done, scraping operations may be carried out more quickly and easily than is the case with scrapers as ordinarily constructed. Furthermore all operations may be done while the scraper is moving forwardly and it is never necessary to halt the same or back it up.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved scraper showing the bowl in its normal transporting position.

Fig. 2 is a similar view showing the control lever as operated to move and hold the bowl blade to a scraping position.

Fig. 3 is a fragmentary cross section on the line 3—3 of Fig. 1.

Fig. 4 is a fragmentary side elevation showing the catch mechanism just as released to permit the bowl to turn.

Referring now more particularly to the characters of reference on the drawings, the numeral 1 denotes the supporting frame of the scraper of suitable construction provided at its forward end with a clevis 2 for connection with a tractor and supported adjacent its rear end by wheels 3. Turnably mounted in the frames 1 toward the rear end thereof is the bowl 4. This bowl is mounted on trunnions 5 which are connected to and supported by links 6 which depend from said trunnions to pivotal connections with the frame as at 7. It will therefore be seen that the bowl may turn on the trunnions as an axis and it may also swing back and forth in the frame about the link pivots 7 as an axis. The bowl is so arranged that its bottom adjacent the rear end normally rides on the ground so that it has frictional engagement therewith, and when the links are in a vertical position the blade $4^a$ of the bowl will be clear of the ground, as shown in Fig. 1, or so that the bowl is then in a transporting position.

Pivoted on the frame ahead of the bowl is a transverse shaft 8 from which on each side of the bowl an arm 9 projects upwardly. A rigid bar 10 extends from this arm to a pivotal connection with the corresponding trunnion and link. An operating lever 11 having a forwardly extending pull rope 12 attached to its upper end is pivoted onto the frame ahead of the shaft 8. A link 13 pivoted on said lever extends rearwardly to a pivotal connection with an arm 14 projecting upwardly from the shaft 8 intermediate its ends.

Pivoted onto and extending between the bars 10 is a transverse shaft 15, from which shaft an operating lever 16 projects upwardly, said lever having a forwardly extending pull rope 17 attached to its upper end. Pivoted on each bar 10 alongside the bowl is an upstanding catch member 18, whose upper end normally projects under and engages a lug 19 projecting from the side of the bowl. The shaft 15 for each catch member has an arm 20 projecting therefrom, with a pivoted link 21 between the arm and the said catch member. When the catch is engaged with the bowl lug the arm 20 and link 21 lie in straight alinement, and are held from upward breaking by a spring 22 connected at one end to the bar 10, and at the other end to the pivot pin 23 between the link and arm. Suitable means may be employed to prevent downward breaking of the arm and link, such as by having the pin 23 overhang the bar when the arm and link are outstretched.

In operation to cause the bowl to shift from the transporting position to the scraping position, as in Fig. 2, it is only necessary to pull the lever 11 forwardly. This pulls ahead on the bars 10 and trunnions 5 and the latter move downwardly and forwardly through the arc whose center is the link pivot 7. The trunnions are therefore lowered, lowering the bowl as a whole and causing the blades to engage the ground as shown in Fig. 2. Since the catch mechanism is mounted on the forwardly moving bars 10, the position of the lugs 19 relative to the catches 18 is not altered and said catches and lugs remain engaged. The arms 9 however are considerably shorter than the links 6 so that with the forward and downward movement of the trunnions through a certain arc the arms 9 move forward and downward through a greater arc. As a result the bars 10, toward their forward ends are lowered somewhat relative to the bowl. The catch lugs 19 follow up and maintain themselves engaged with the members 18 due to the rotative pressure imparted to the bowl as the latter remains engaged with the ground and the scraper moves forward. The bowl therefore while being lowered assumes a different angle to the ground, so that while the blade and the bottom of the bowl in a transporting position has a rearward and downward slant as shown in Fig. 1; when moved to a scraping position it has a rearward and upward slant as shown in Fig. 2.

When the bowl is loaded the forward pressure on the lever 11 is released. With the continued forward movement of the scraper and with the bottom of the bowl still frictionally engaged with the ground, said bowl has a tendency to move rearwardly relative to the frame. Since the bowl is connected to the frame by the flexibly mounted links 6 it can thus move rearwardly to a certain extent. In so doing however the upper ends of the links automatically moved rearwardly and upwardly and consequently the trunnions are lifted and moved rearwardly also. Since the bars 10 are attached to said links said bars also move rearwardly and in so doing raise somewhat at their forward ends, and as the catches 18 are still engaged with the lugs 19 the latter are pushed up somewhat with such movement of the bars. In other words the angle of the blade is reversed and it returns to its original position, just as was described in connection with the lowering movement of the blade, but of course in the opposite direction. As a result the bowl is automatically returned to a raised transporting position without any physical exertion on the part of the operator being necessary to accomplish this result. The links do not tend to turn rearwardly beyond a vertical position, since the trunnions will again start to drop—a possible movement which of course is offset by the engagement of the bottom of the bowl with the ground. In order to definitely limit such rearward movement of the bowl however and prevent any slight back and forth rocking of the bowl, a stop pin 24 is mounted in the link 13 to be engaged by the lever 11 when the links 6 reach said vertical position.

When it is desired to cause the bowl to rotate about the trunnions so as to upset the bowl for spreading or dumping it is only necessary to pull the lever 16, it being immaterial whether the bowl is in a loading or transporting position, since the operation of the lever 11 has nothing to do with the operation of the lever 16. This forward pull on the lever 16 causes the straight line of the members 20 and 21 to be broken at the pin 23, raising the latter, placing the spring 22 under tension, and consequently moving the members 18 forward and clear of the lugs 19 as shown in Fig. 4. The bowl can then freely rotate to upset and discharge its load and if unhindered will of course continue turning until it has returned to its original position, the lever 16 being released in time to permit the catch members to again engage the lugs.

In order to permit the bowl to be held in a spreading position instead of being allowed to make a complete revolution, additional catch engaging lugs 19$^a$ are mounted on the bowl in a position to engage said catches when the bowl has turned sufficiently to cause the blade to be disposed in a substantially vertical plane and clear of the ground somewhat.

As shown in Fig. 1 the catch engaging faces of the lugs 19 are not positioned truly radial with the trunnions but are disposed at an acute rear angle to a radial line relative to the direction of rotation of the bowl, so as to facilitate pulling the catches 18 clear of the lugs.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A scraper including a frame to be moved along the ground, a bowl having a scraping blade, trunnions for the bowl, members connecting the trunnions to the frame in a manner to permit said trunnions to move forwardly from a predetermined position, the blade when the trunnions are in such position being clear of the ground; control means for moving the trunnions from said position, and means whereby with such movement of the trunnions the blade will engage the ground.

2. A structure as in claim 1, with means incorporated with said members and the control means for causing the trunnions to automatically tend to return to said original predetermined position with the forward movement of the scraper.

3. A structure as in claim 1, with releasable means, functioning independently of the control means, for normally preventing rotation of the bowl about the trunnions.

4. A scraper including a frame to be moved along the ground, a bowl engaging the ground and having a blade, trunnions on the bowl, substantially vertical links supporting the trunnions and depending thence to pivotal connections with the frame, horizontally movable control bars connected to the links, releasable catch members mounted on the bars, and lugs on the bowl normally engaging the catch members.

5. A scraper including a frame to be moved along the ground, a bowl engaging the ground and having a blade, trunnions on the bowl, substantially vertical links supporting the trunnions and depending thence to pivotal connections with the frame, horizontally movable control bars connected to the links, and extending forwardly from the same, a transverse shaft ahead of the bowl, arms projecting upwardly from the shaft and to the upper ends of which the forward ends of the bars are connected, means for rotating the shaft, and catch means between the bars and bowl normally preventing rotation of the latter; the arms being shorter than the distance between the pivotal connections of the bars with the links and the connection of the latter with the frame.

6. A scraper comprising a frame to be moved along the ground, a bowl rotatably hung therein and engaging the ground whereby the bowl tends to rotate with the forward movement of the frame, means normally preventing such rotation, means supporting the bowl from the frame in a manner to permit of relative forward and rearward movement of said bowl, and means included in part with said supporting means for causing the blade of the bowl to engage the ground when the bowl moves forwardly in the frame and to move clear of the ground when the bowl moves rearwardly in the frame.

7. A scraper including a frame to be moved along the ground, a bowl having a scraping blade, trunnions for the bowl, members directly connecting the trunnions to the frame in a manner to permit said trunnions to move forwardly from a predetermined position, substantially horizontal control bars projecting forwardly from said members, means for moving said bars forwardly, and means whereby with such movement the blade of the bowl will engage the ground at a downward and forward angle.

8. A scraper including a frame to be moved along the ground, a bowl having a scraping blade, trunnions for the bowl, members connecting the trunnions to the frame in a manner to permit said trunnions to move forwardly from a predetermined position, substantially horizontal control bars projecting forwardly from said members, a pivoted catch member projecting upwardly from one bar alongside the bowl, a lug on the bowl normally engaging the scraper, a transverse shaft mounted on the bar ahead of the catch, an arm projecting radially from the shaft, a link from said arm to the catch, said arm and link being longitudinally alined when the catch is engaged with the lug, and means applied to the shaft for moving said arm and link out of alinement to cause the catch member to be turned out of engagement with the lug.

In testimony whereof I affix my signature.

BRUCE E. ROSE.